United States Patent [19]

Spars et al.

[11] 4,415,365

[45] Nov. 15, 1983

[54] BARRIER FOR CONTAINING SPENT OIL SHALE

[75] Inventors: Byron G. Spars, Mill Valley; Lawrence E. Santucci, San Anselmo, both of Calif.

[73] Assignee: Chevron Research Company, San Francisco, Calif.

[21] Appl. No.: 305,332

[22] Filed: Sep. 24, 1981

[51] Int. Cl.$^3$ ................................................. C04B 7/30
[52] U.S. Cl. .......................................... 106/85; 106/89
[58] Field of Search ..................... 106/85, DIG. 1, 89, 106/97, 100, 103; 405/128, 129, 266, 267; 208/11 R

[56] References Cited

U.S. PATENT DOCUMENTS 4,320,994   3/1982   Mallon ................................ 405/267

OTHER PUBLICATIONS

An Assessment of Oil Shale Technologies, U.S. Office of Technology Report, Ch. 8, p. 334.
Processed Shale Studies: Environmental Impact Analysis, Appendix 5, Colony Development Operation, Atlantic Richfield Co., 1974.

*Primary Examiner*—James Poer
*Attorney, Agent, or Firm*—Burns, Doane, Swecker & Mathis

[57] ABSTRACT

A water impermeable liner, cap, or dam core for a containment basin for spent oil shale is made from a mixture of water and combusted oil shale having a particle size of less than about one cm, a residual organic carbon content of less than 1%, and at least 15% of its Mg/Ca/Fe carbonate minerals decomposed. A layer of the mixture is applied to the basin and/or top of the filled basin, compacted, and allowed to cure under conditions that minimize the likelihood of shrinkage cracking.

9 Claims, 4 Drawing Figures

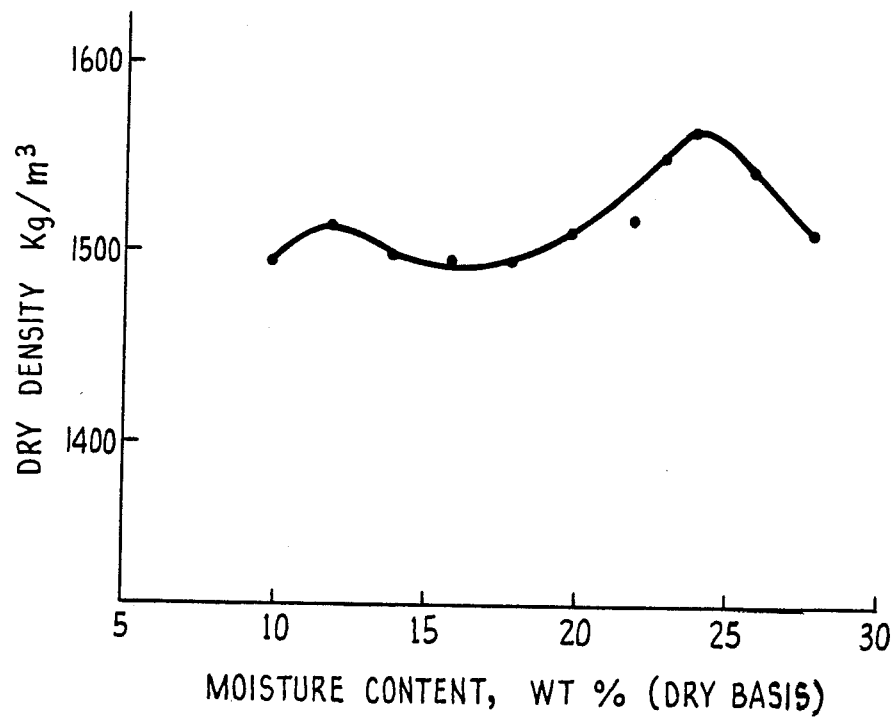
FIG_1_
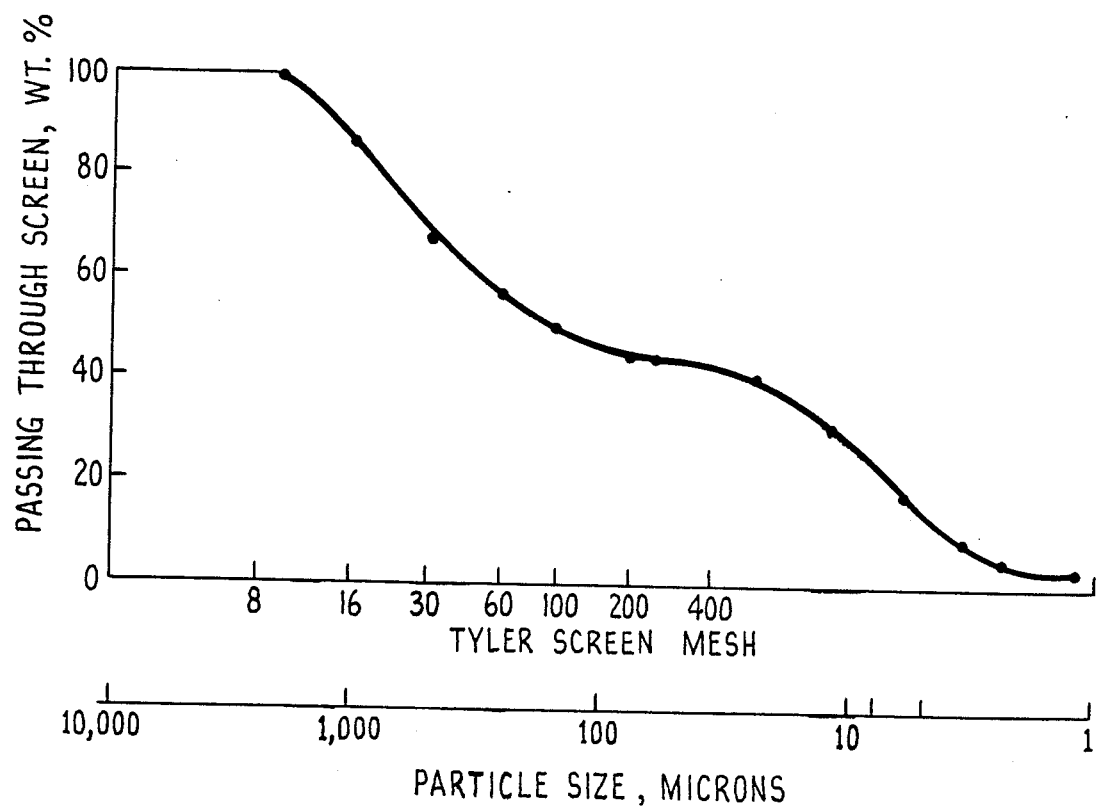
FIG_2_

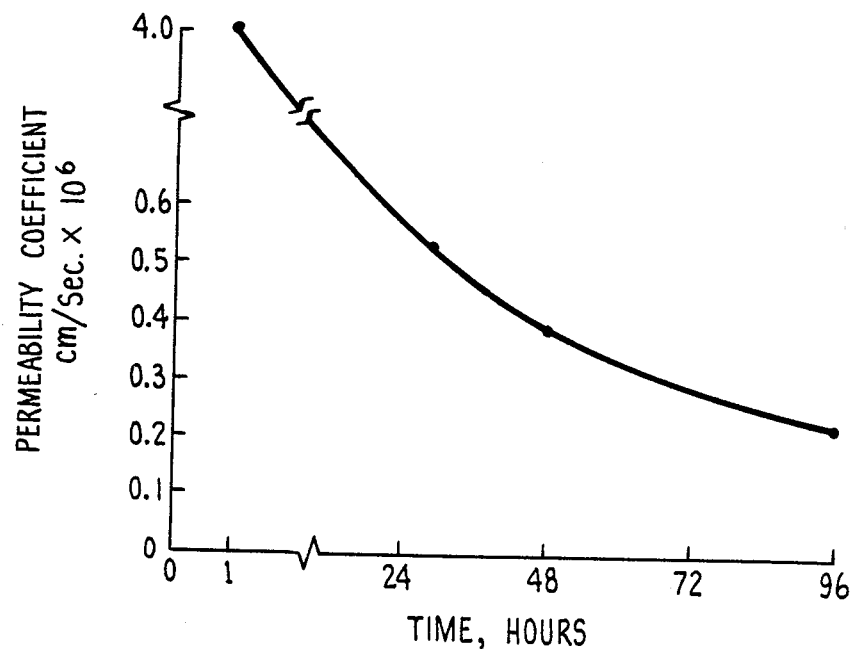
FIG_3_
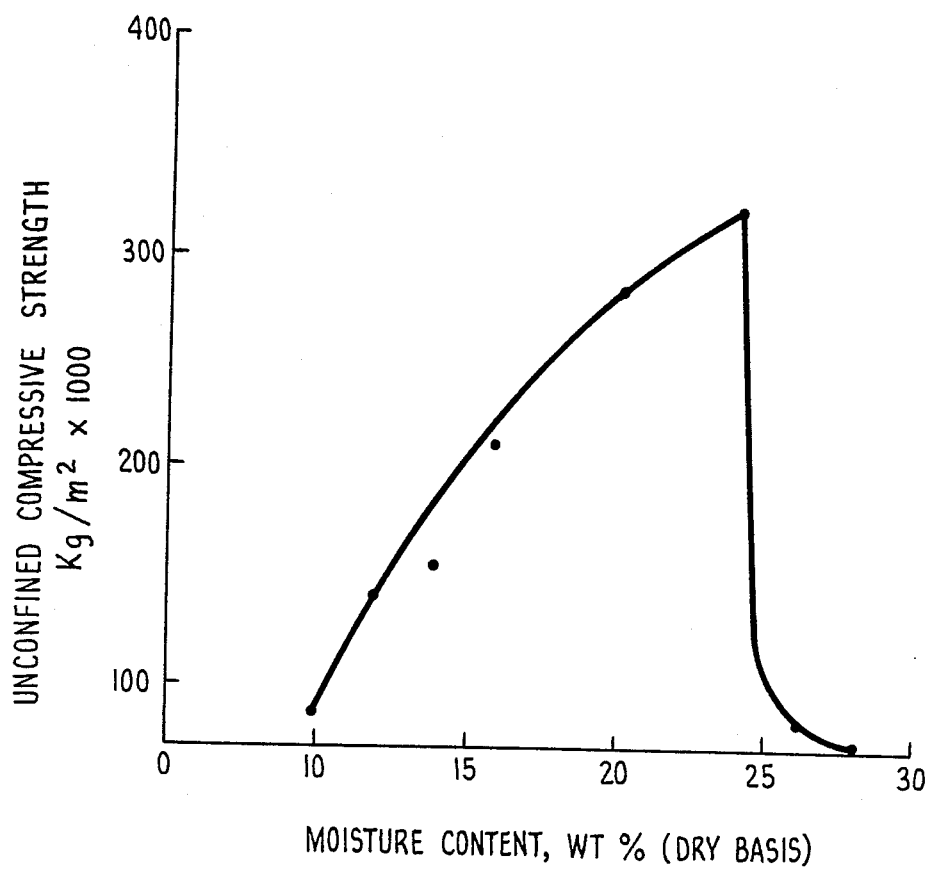
FIG_4_

BARRIER FOR CONTAINING SPENT OIL SHALE

BACKGROUND OF THE INVENTION

1. Field of the Invention

The invention concerns a composition that may be used to construct a substantially water impermeable barrier for containing spent oil shale.

2. Description of the Prior Art

Oil shale is becoming an increasingly important source of energy. Oil shale is a fine-grained sedimentary rock that contains organic material known as kerogen. Various retorting processes have been used or proposed to pyrolize the kerogen in the shale to yield liquid oil and gases. The liquid oil may be refined into a full slate of fuel products. Commercial scale retorting processes also yield formidable quantities of spent shale. The large amounts of spent shale from the retort process must be used or disposed of in a practical way without causing ecological damage.

While limited amounts of the spent shale may be used as an aggregate substitute in asphalt paving or in other construction applications, it appears likely that the bulk of it will be disposed by surface landfill. That is, the spent shale will be placed in natural or man-made containment basins near plant sites. Such disposal presents a potential ecological problem because the spent shale will be exposed to rain or snow which may leach various materials therefrom and contaminate indigenous water supplies.

The present invention obviates such contamination by providing a barrier member or members for such basins, in the form of an impermeable cap, bottom liner, or dam core, whose main component is a combusted shale having physical and chemical characteristics that render it especially suitable for being formed into a stable, substantially water impermeable mass. In this regard a recent U.S. Office of Technology Report "An Assessment of Oil Shale Technologies," Ch. 8, p. 334 reports that oil shales that have been retorted at high temperatures and then moistened will begin to harden within 24 hours by a curing reaction similar to that of concrete and that the hardening will continue with time. Hardening is accelerated by compaction, heat, and high pressure. Also, Processed Shale Studies: Environmental Impact Analysis, Appendix 5, Colony Development Operation, Altantic Richfield Co., 1974, proposes that processed shale might be used by local contractors to make linings for irrigation ditches and dams.

Shales have also been used to make building materials, such as wallboard. U.S. Pat. No. 1,847,366 describes a wallboard that is made from a mixture of sodium silicate, light magnesium carbonate and ground shale. U.S. Pat. No. 2,462,538 discloses building articles made by casting mixtures of burned clay or shale and a water insoluble silicate.

SUMMARY OF THE INVENTION

One aspect of the invention is a composition for making a cementitious, substantially water impermeable barrier comprising a mixture of:

(a) about 70% to about 90% by weight particulate combusted oil shale having a particle size of less than about one centimeter, a residual organic carbon content of less than about 1% by weight, and at least about 15% by weight of its Mg, Fe and Ca carbonate content decomposed; and (b) about 10% to about 30% by weight water.

Another aspect of the invention is a barrier member for a containment basin for spent oil shale, comprising a cured compacted layer of the above-described combusted oil shale-water mixture, and thickness of which is sufficient to provide a substantially impermeable barrier to water.

Still another aspect of the invention is a process for making said barrier member comprising:

(a) applying a layer of the above-described combusted oil shale-water mixture to the basin, or to the top of a filled basin;

(b) compacting the layer to at least about 95% of standard laboratory density, the total compacted thickness of the layer being at least about 15 cm; and (c) allowing the compacted layer to cure.

BRIEF DESCRIPTION OF THE DRAWINGS

In the drawings:

FIG. 1 is a graph showing the dry density-moisture content relationship of combusted oil shale as determined by the standard Proctor test (ASTM D 698-70);

FIG. 2 is a graph showing the particle size distribution of a combusted oil shale described below;

FIG. 3 is a graph showing the relationship between the permeability coefficients of the invention barriers (compacted according to ASTM D 1557-70) and cure time; and FIG. 4 is a graph showing the relationship between the compressive strength of the invention barriers (determined by ASTM D1663-68) and moisture content of the combusted oil shale-water mixture.

DETAILED DESCRIPTION OF THE INVENTION

The term "retorted oil shale" is used here to mean oil shale from which a substantial portion, and preferably essentially all, of the kerogen has been removed but which contains residual carbon (commonly called "char").

The term "combusted oil shale" is used herein to mean retorted oil shale from which at least a substantial portion of the residual carbon has been removed by combustion.

The term "spent oil shale" is used herein to mean retorted oil shale, combusted oil shale, or mixtures thereof.

The term "size" as used herein in reference to particles of combusted oil shale means the nominal diameter of such particles.

The term "standard laboratory density" as used herein means the density of a sample of the combusted oil shale-water mixture as determined by the standard Proctor test (ASTM D 698-70, 1972 Annual Book of ASTM Standards, Part 11).

As indicated above, the combusted oil shale that is used in the invention has a maximum particle size less than about one cm, a residual carbon content less than about 1% by weight and at least about 15% by weight, preferably 20% to 35% by weight, of its Mg, Ca and Fe carbonates decomposed to corresponding oxides. The particle size and residual carbon content of the combusted oil shale are important factors affecting the compactibility of the combusted oil shale-water mixture as well as the amount of water that must be included to achieve good pozzolanic activity. Correspondingly, the proportion of Mg, Ca and Fe carbonates converted to oxides affects the compressive strength of the cured barrier.

Calcite and dolomite or ankerite are the principal Mg/Fe/Ca carbonate minerals of most oil shales. The extent to which these minerals are present varies in different shale deposits. In shales from the Green River deposit in Colorado, Utah, and Wyoming these minerals normally constitute about 20% to about 60%, more usually 30% to 40%, by weight of the mineral composition of the shale. The retort/combustion conditions, principally temperature and time, to which the shale is subjected will determine the extent to which these carbonate minerals are decomposed to carbon dioxide and oxides. Under conditions normally used in retorting/combustion, mainly dolomite or ankerite will be decomposed with little calcite being decomposed. However, use of higher than normal retorting or combustion temperatures may result in significant calcite decomposition.

The optimum amount of water to be added to a combusted oil shale of given particle size and residual carbon content is that which maximizes the density of the compacted layer. This relationship may be determined by using the standard Proctor test on sample mixtures of varying moisture content. This test is designed to determine the relationship between moisture and the density of compacted soil and may be used to develop a moisture-density curve of the kind shown in FIG. 1. The curve shown in FIG. 1 was obtained using samples of a combusted oil shale obtained from a laboratory retort. One hundred percent by weight of the particles of this combusted oil shale passed through a No. 8 Tyler Screen (2380 micron screen opening) and 91.8% passed through a No. 16 Tyler Screen (1190 micron screen opening). A particle size distribution curve for the combusted oil shale is given in FIG. 2. It contained 0.5% by weight residual organic carbon and approximately 30% by weight of its Mg/Ca/Fe carbonates had been decomposed. As shown in FIG. 1, a maximum dry density of 1540 kg/m$^3$ was obtained at a moisture content of about 24% by weight. At higher and lower moisture contents, the dry density decreased. Moisture contents greater than optimum inhibit compaction and drastically reduce the strength of the compacted combusted oil shale. The optimum moisture content for the combusted oil shale that is used in the invention will usually be in the range of 15% to 30% by weight. In this instance, the combusted shale oil constitutes 70 to 85% by weight of the mixture.

The density of the compacted shale-water mixture can also be increased by increasing compactive effort. This was accomplished in the laboratory by using the modified Proctor Test (ASTM D 1557-70) which calls for a 4.5 times greater compactive effort (56,250 ft-lb/ft$^3$ or 1,290 j/m$^3$ versus 12,375 ft-lb/ft$^3$ or 285 j/m$^3$) than the standard Proctor test. In an effort to minimize water consumption a greater compactive effort at lower than optimum moisture content may be preferred in the construction of the liner, cap, or dam core.

The density of the compacted shale-water mixture and the proportion of water in the mixture play important roles in the water permeability of the barrier made from the mixtures. The barrier must be substantially impermeable to water to avoid contamination of group water or neighboring streams from salts or other materials leached from the spent shale contained in the basin. In this regard a barrier material is considered substantially impermeable if it has a coefficient of permeability less than about $1 \times 10^{-6}$ cm/sec (1 ft. per year), preferably less than $5 \times 10^{-7}$ cm/sec (0.5 ft. per year). The coefficient of permeability for compacted shale-water mixtures may be determined by forcing water under a known head of pressure through a cylindrical sample of the compacted mixture of known dimensions, measuring the flow rate of water emerging from the sample, and solving for the coefficient using the expression $$k = (Q/A) \cdot (l/h)$$

where
- $k$ = permeability coefficient,
- $Q$ = flow rate,
- $A$ = cross-sectional area of sample,
- $h$ = head of pressure,
- $l$ = length of sample.

The permeability coefficient decreases with cure time of the compacted shale-water mixture as shown in FIG. 3. Permeability coefficients less than $0.6 \times 10^{-6}$ cm/sec were obtained after 24 hours' cure on a combusted oil shale sample containing 12% by weight moisture and compacted by the modified Proctor test.

The combusted oil shale component of the mixture is produced by retorting/combusting raw oil shale. If the particular retort process does not automatically yield a spent shale product meeting the invention requirements, the product will have to be treated further. Such further treatment may involve crushing the product to obtain the required particle size and/or calcining the product to reduce the residual carbon content or increase the content of decomposed carbonates. Usually a retorting process that utilizes a finely divided shale feed and partially burns the char present on the retorted shale will provide a suitable material for use in the invention without the need for further processing.

Although the addition of other materials to the shale-water mixture will normally not be needed to make the mixture suitable for use in making the barriers, the addition of certain materials may improve various properties of the barrier. For instance, cement may be added to the mixture to increase the compressive strength of the barrier. Clays such as bentonites or hydrophobic organic binders may be added to the mixture to enhance the water impermeability of the barrier.

In making the containment basin liners, impermeable caps, or dam cores according to the invention, the combusted oil shale, water, and any additives that may be desired are mixed to form a uniform composition. The mixing is preferably done on site and may be accomplished using various means such as rotating drum vessels similar to those used to mix cement and water. In the case of impermeable caps and liners, the composition is applied in one or more applications to the top of the disposal site or to the walls of the basin respectively and spread thereon to form a layer of the desired thickness. Dam cores may be made from the composition using conventional dam construction methods. The layer or core may be compacted against the earthen or other support to increase its density when its consistency (fluidity) is such that it can bear the compressive load without significant flow normal to the load. Thus, depending upon the particular mixture being used, compaction may be effected immediately after the mixture is spread or it may be necessary to wait until the layer has partly cured. The compaction may be carried out using roller compactors such as are commonly employed in the construction of soils or construction of roads. The extent of compaction is determined by comparing the density of a sample of the compacted layer with the standard laboratory density of a test specimen of the composition.

Curing procedures similar to those used in laying concrete may be employed in forming the barrier. Accordingly, the barrier will usually be cured at temperatures above 10° C. The barrier loses water during curing, with the rate of water loss being primarily dependent on temperature and relative humidity. As in the case of concrete, rapid water loss may cause the barrier to shrink in a manner that develops shrinkage stresses that exceed the tensile strength of the material. If this occurs, cracks will be created in the barrier and its effectiveness as a water impermeable member will be impaired or destroyed. Precautions to reduce the rate of water loss by reducing the cure temperature or increasing the relative humidity above the barrier surface, such as by covering the barrier with a water impermeable sheet or periodically wetting the barrier surface, may be employed to lessen the likelihood of forming shrinkage cracks. In most instances the basin may be used after about 2 to 6 days of curing. After curing the barrier will usually have lost up to about 80% of its water, with the remaining water having been either consumed in the hydration that occurred during cementation or retained in the barrier as residual moisture.

The compressive strength of the barrier will depend upon the composition of the mixture from which it was made, the extent of compaction, and the curing conditions. Typically, the barrier member will have a compressive strength above above $7 \times 10^4$ kg/m² (100 psi) after one week of curing. When curing is substatially complete (after about one month) the compressive strength will usually be in the range of $1 \times 10^5$ to $3.5 \times 10^5$ kg/m² (150 to 500 psi). The unconfined compressive strength-moisture relationship for the combusted shale discussed above after 14 days' cure is shown in FIG. 4. Compressive strength may be determined using samples of the barrier material in conventional test procedures (ASTM D 1633-68).

The following hypothetical example further illustrates the invention. This example is not intended to limit the invention in any manner.

A combusted oil shale is made by crushing oil shale containing approximately 35% by weight Mg/Fe/Ca carbonate minerals (ankerite and calcite) into particles less than about one cm in diameter and retorting the crushed shale at temperatures in excess of about 470° C. that pyrolizes the kerogen. The char from the retorted shale is substantially combusted at temperatures in excess of about 590° C. This combusted oil shale contains approximately 0.5% by weight residual carbon and approximately 30% by weight of its Mg/Fe/Ca carbonates (primarily ankerite) are decomposed to their corresponding oxides.

Water is added to the combusted oil shale with mixing until the moisture content of the mixture is approximately 25% by weight. The standard laboratory density of the mixture is approximately 1550 kg/m³.

The mixture is spread against the walls of an open earthen pit to a thickness of about 25 cm and allowed to cure. After about 1 hour curing, the layer is compacted to 100% of standard laboratory density. After several days curing, the layer has cured into a substantially water impermeable barrier. The pit provides a suitable containment basin for spent shale.

The above described modes for carrying out the invention are not intended to limit the invention. Variations or modifications of those modes that are apparent to those of ordinary skill in the arts related to the invention are intended to be within the scope of the following claims.

We claim:

1. A composition for use in making a cementitious, substantially water impermeable barrier having a cured coefficient of permeability less than about $1 \times 10^{-6}$ cm/sec., the composition being comprised of a mixture of:
   (a) about 70% to about 90% by weight particulate combusted oil shale having
      (i) a particle size of less than about one centimeter;
      (ii) a residual organic carbon content of less than about 1% by weight; and
      (iii) from about 20 to 35% by weight of its Mg, Ca, and Fe carbonate minerals content decomposed; and
   (b) about 10% to about 30% by weight water.

2. The composition of claim 1 wherein the combusted oil shale constitutes 70% to 85% by weight of the mixture and the water constitutes 15% to 30% by weight of the mixture.

3. A barrier member for a containment basin for spent oil shale, the barrier member having a cured coefficient of permeability less than about $1 \times 10^{-6}$ cm/sec. and being comprised of a cured, compacted layer made from a mixture of:
   (a) about 70% to about 90% by weight particulate combusted oil shale having
      (i) a particle size of less than about one centimeter;
      (ii) a residual organic carbon content of less than about 1% by weight; and
      (iii) from about 20 to 35% by weight of its Mg, Ca and Fe carbonate minerals content decomposed; and
   (e) about 10% to about 30% by weight water.

4. The barrier member of claim 3 wherein the combusted oil shale constitutes 70% to 85% by weight of the mixture and the water constitutes 15% to 30% by weight of the mixture.

5. The barrier member of claim 3 wherein the permeability coefficient of the barrier member is less than about $5 \times 10^{-7}$ cm/sec.

6. The linear of claim 3 wherein the layer is compacted to at least about 95% of standard laboratory density.

7. A process for making a barrier member for a containment basin for spent oil shale comprising:
   (a) applying a layer of a mixture of
      (i) about 70% to about 90% by weight particulate combusted oil shale having a particle size of less than about one centimeter, a residual organic carbon content of less than about 1% by weight, and from about 20 to 35% by weight of its Mg, Ca and Fe carbonate minerals content decomposed; and
      (ii) about 10% to about 30% by weight water to the basin;
   (b) compacting the layer to at least about 95% of standard laboratory density; and
   (c) allowing the compacted layer to cure thereby resulting in a coefficient of permeability less than about $1 \times 10^{-6}$ cm/sec.

8. The process of claim 3 wherein the combusted oil shale ash constitutes 70% to 85% by weight of the mixture and the water constitutes 15% to 30% by weight of the mixture.

9. The process of claim 8 wherein the curing the compacted layer is carried out under conditions that reduce the rate of water loss from the layer below that which causes shrinkage cracking.

* * * * *